United States Patent
Jiang et al.

(10) Patent No.: US 10,202,281 B2
(45) Date of Patent: Feb. 12, 2019

(54) METHOD FOR PREPARING SULFONATED GRAPHENE FROM ORGANIC MATERIAL AND SULFONATED GRAPHENE

(71) Applicant: SUZHOU GRAPHENE-TECH CO., LTD., Suzhou, Jiangsu (CN)

(72) Inventors: Yonghua Jiang, Suzhou (CN); Jianmin Li, Jiangsu (CN); Jiandong Hao, Jiangsu (CN)

(73) Assignee: SUZHOU GRAPHENE-TECH CO., LTD., Suzhou, Jiangsu (CN)

( * ) Notice: Subject to any disclaimer, the term of this patent is extended or adjusted under 35 U.S.C. 154(b) by 0 days.

(21) Appl. No.: 15/315,422

(22) PCT Filed: Feb. 3, 2015

(86) PCT No.: PCT/CN2015/072176
§ 371 (c)(1),
(2) Date: Dec. 1, 2016

(87) PCT Pub. No.: WO2015/184843
PCT Pub. Date: Dec. 10, 2015

(65) Prior Publication Data
US 2017/0197838 A1    Jul. 13, 2017

(30) Foreign Application Priority Data
Jun. 4, 2014 (CN) .......................... 2014 1 0244717

(51) Int. Cl.
*C07C 309/33* (2006.01)
*C01B 32/18* (2017.01)
(Continued)

(52) U.S. Cl.
CPC ............... *C01B 32/18* (2017.08); *C01B 3/00* (2013.01); *C01B 3/04* (2013.01); *C01B 32/15* (2017.08);
(Continued)

(58) Field of Classification Search
CPC ..... B82Y 40/00; C01P 2004/24; C08K 3/042; C08K 5/52
(Continued)

(56) References Cited

U.S. PATENT DOCUMENTS 4,070,446 A    1/1978   Horikiri et al.
6,099,960 A    8/2000   Tennent et al.
(Continued)

FOREIGN PATENT DOCUMENTS

CN    101817520 A    9/1978
CN    101531765      9/2009
(Continued)

OTHER PUBLICATIONS

Siting et al., Plastic Material and Additive. Tianjin University Press. 1st edition. Jul. 1, 2007;14.
(Continued)

*Primary Examiner* — Alexandre F Ferre
(74) *Attorney, Agent, or Firm* — Wolf, Greenfield & Sacks, P.C.

(57) ABSTRACT

The present invention relates to a method for preparing a sulfonated graphene from an organic material and to the sulfonated graphene prepared therefrom. The method comprises the following steps: a first contact step: a reaction medium containing oxidative sulfonating agent is allowed to come into contact with the organic macromolecular material at a first temperature; and, a second contact step: when the first contact step is completed, in same reaction medium, the reaction temperature is increased to a second temperature to allow for continued reaction, thus producing the sulfonated graphene.

15 Claims, 1 Drawing Sheet

(51) Int. Cl.
- C01B 3/00 (2006.01)
- C01B 3/04 (2006.01)
- C08J 7/12 (2006.01)
- C01B 32/15 (2017.01)
- C01B 32/184 (2017.01)
- B82Y 30/00 (2011.01)
- B82Y 40/00 (2011.01)

(52) U.S. Cl.
CPC ............ *C01B 32/184* (2017.08); *C08J 7/12* (2013.01); *B82Y 30/00* (2013.01); *B82Y 40/00* (2013.01); *C01B 2204/04* (2013.01); *C01B 2204/32* (2013.01); *C01P 2004/16* (2013.01); *C01P 2004/22* (2013.01); *C01P 2004/24* (2013.01); *C01P 2004/32* (2013.01); *Y02E 60/324* (2013.01); *Y02E 60/364* (2013.01); *Y02P 20/134* (2015.11); *Y10S 977/734* (2013.01); *Y10S 977/842* (2013.01); *Y10S 977/896* (2013.01)

(58) Field of Classification Search
USPC ............................................ 423/445 R, 448
See application file for complete search history.

(56) References Cited

U.S. PATENT DOCUMENTS

| | | |
|---|---|---|
| 2006/0210466 A1 | 9/2006 | Mitra et al. |
| 2006/0223947 A1 | 10/2006 | Olesik et al. |
| 2013/0084455 A1 | 4/2013 | Naskar et al. |
| 2013/0108540 A1 | 5/2013 | Baek et al. |
| 2017/0197837 A1 | 7/2017 | Jiang et al. |

FOREIGN PATENT DOCUMENTS

| | | | |
|---|---|---|---|
| CN | 101618870 A | | 1/2010 |
| CN | 103359728 A | | 10/2013 |
| CN | 103539105 A | | 1/2014 |
| CN | 103787320 A | | 5/2014 |
| JP | S49-100331 B2 | | 9/1974 |
| JP | S50-004324 A | | 1/1975 |
| JP | H08-012310 | | 1/1996 |
| JP | 2003-086022 | | 3/2003 |
| JP | 2004-115354 | | 5/2004 |
| JP | 2004-238311 | | 8/2004 |
| JP | 2008-510640 | | 4/2008 |
| JP | 2009-268961 | | 11/2009 |
| JP | 2010-195671 A | | 9/2010 |
| JP | 2011-098843 A | | 5/2011 |
| KR | 10-2013-0045736 | | 10/2011 |
| WO | WO 2005/029508 A1 | | 3/2005 |
| WO | WO 2009/143405 A2 | | 11/2009 |
| WO | WO 2014/011460 A1 | | 1/2014 |

OTHER PUBLICATIONS

International Search Report and Written Opinion for Application No. PCT/CN2015/072176 dated May 6, 2015.
International Preliminary Report on Patentability for Application No. PCT/CN2015/072176 dated Dec. 6, 2016.
International Search Report and Written Opinion for Application No. PCT/CN2015/080559 dated Sep. 11, 2015.
International Preliminary Report on Patentability for Application No. PCT/CN2015/080559 dated Dec. 6, 2016.
Chinese Office Action for Application No. 201580002366.5 dated Feb. 4, 2017.
Chinese Office Action for Application No. 201580002367.X dated Dec. 26, 2016.
Chinese Office Action for Application No. 201580002367.X dated Jul. 17, 2017.
Basu et al., Morphological changes during annealing of polyethylene nanocrystals. Eur Phys J E Soft Matter. Mar. 2012;35(3):1-12. doi:10.1140/epje/i2012-12018-9. Epub Mar. 19, 2012.
Chen et al., Preparation of sulfonic-functionalized graphene oxide as ion-exchange material and its application into electrochemiluminescence analysis. Biosens Bioelectron. Mar. 15, 2011;26(7):3136-41. doi: 10.1016/j.bios.2010.12.015. Epub Dec. 16, 2010.
Gohil et al., Crystallinity in chemically crosslinked low density polyethylenes: 3. Morphology of the XLPE-2 system. Polymer. Nov. 1986;27:1687-1695.
Hiroshi, Structural analysis of the crystalline polymer obtained by scattering method. NICHIAS technical time. Mar. 31, 2014;365.
Kalnins et al., Treatment of Polyethylene and Polypropylene with Chlorosulphonic Acid to Study the Surface Morphology. Polymer Testing. 1992;11:139-150.
Kanig, Kristallisier-und Schmelzvorgange bei Polymeren. Colloid Polymer Sci. Apr. 1982;260(4):356-377.
Liu et al., Sulfated graphene as an efficient solid catalyst for acid-catalyzed liquid reactions. J Mat Chem. 2012;12.
Martinez-Salazar et al., Lamellar structure in melt crystallized low density polyethylene. Colloid Polymer Sci. 1983;261:412-416.
Schaper et al., Elektronenmikroskopische Untersuchungen an hochdruckkristallisiertem Polyathylen. Faserforsch. Textiltechnik/ Z. Polymerforsch. 29 (1978) 245-248.
STN Databaseaccession No. 152:195581. Fu et al. Feb. 18, 2010.
Wang et al., Synthesis and characterization of sulfonated graphene as a highly active solid acid catalyst for the ester-exchange reaction. Catal Sci Technol. 2013;3:1194.
Zhang et al., Thermal characterization of sulfonated polyethylene fibers. Thermo Acta. 1993;226:123-132.
Zhou et al., Binder-free phenyl sulfonated graphene/sulfur electrodes with excellent cyclability for lithium sulfur batteries. J. Mater Chem. 2014;2:5117.
EP 15803589.9, dated Nov. 23, 2017, Extended European Search Report.
EP 15802712.8, dated Nov. 11, 2017, Extended European Search Report.
U.S. Appl. No. 15/315,398, filed Dec. 1, 2016, Jiang et al.
PCT/CN2015/072176, dated May 6, 2015, International Search Report and Written Opinion.
PCT/CN2015/072176, dated Dec. 6, 2016, International Preliminary Report on Patentability.
PCT/CN2015/080559, dated Sep. 11, 2015, International Search Report and Written Opinion.
PCT/CN2015/080559, dated Dec. 6, 2016, International Preliminary Report on Patentability.
CN 201580002366.5, dated Feb. 4, 2017, 1st Chinese Office Action.
CN 201580002367.X, dated Dec. 26, 2016, 1st Chinese Office Action.
CN 201580002367.X, dated Jul. 17, 2017, 2nd Chinese Office Action.

METHOD FOR PREPARING SULFONATED GRAPHENE FROM ORGANIC MATERIAL AND SULFONATED GRAPHENE

CROSS-REFERENCE TO RELATED APPLICATIONS

This application is a national stage filing under 35 U.S.C. § 371 of international application PCT/CN2015/072176 filed Feb. 3, 2015, which claims priority to Chinese Patent Application No. 201410244717, filed Jun. 4, 2014, the disclosures of each of which are incorporated by reference herein in their entirety.

TECHNICAL FIELD

The present invention relates to a method for preparing graphene, specifically a method for preparing sulfonated graphene from organic material, especially from an organic polymer material or an organic small molecular material such as hydrocarbon, and relates to a sulfonated graphene.

BACKGROUND

Current techniques for producing graphene and graphene oxide are mainly: chemical vapor deposition method (CVD), oxidation-reduction method and other methods. In prior art, graphite or graphene products are used as starting materials to produce graphene oxide. The method has low yield, high cost, heavy pollution, and low product quality, and the characteristics of the product are difficult to be controlled. For example, current methods for producing graphene have the disadvantages and drawbacks as follows: for the CVD method, severe requirement on production process and high cost; for the oxidation-reduction method, complicated process and the requirement of heavy metal ions. Sulfonated graphene, an important type of functionalized graphene, is increasingly used in various graphene applications. There is still a demand for a new method for preparing sulfonated graphene on a large scale. Meanwhile, there are still a large number of demands for sulfonated graphene having homogenous properties.

SUMMARY

The present invention provides a new method for producing sulfonated graphene, and a sulfonated graphene produced by the method.

Specifically, the present invention comprises the following contents:

Embodiment 1

A method for producing sulfonated graphene from an organic material, the method comprising:

a first contact step: contacting a reaction medium containing an oxidative sulfonating agent with the organic material at a first temperature; and a second contact step: after the first contact step has been finished, in the same reaction medium, increasing the reaction temperature to a second temperature to continue to react, thereby obtaining the sulfonated graphene.

Embodiment 2

The method of embodiment 1, wherein the oxidative sulfonating agent comprises at least one selected from the group consisting of: a compound having the general formula R—SO$_3$H, wherein R is selected from the group consisting of F, Cl, and Br; a combination of H$_2$SO$_4$ and HCl; a combination of H$_2$SO$_4$ and HF; concentrated sulfuric acid; fuming sulfuric acid; and a combination thereof.

Preferably, wherein the concentration of the oxidative sulfonating agent in the reaction medium is higher than 98 wt %.

Embodiment 3

The method of embodiment 1, wherein the first temperature is within a range from the melting temperature of the organic material up to the boiling point of the reaction medium; and the second temperature within a range of equal to or greater than the boiling point of the reaction medium; preferably, wherein the first temperature is within a range of 40-130° C., and the second temperature is within a range of 150-220° C.

Embodiment 4

The method of embodiment 1, wherein the first contact step is carried out for a duration within a range of from 1 hour to 40 hours, and the duration of the second contact step is carried out for a duration within a range of from 1 hour to 40 hours.

Embodiment 5

The method of embodiment 1, wherein the organic material is selected from the group consisting of organic polymer materials and organic small molecular materials, wherein, preferably, the organic polymer material is selected from the group consisting of polyethylene wax, chlorinated polyethylene, acetylene oligomer, polyacetylene, polyalkynes containing a halogen element such as polyalkyne halide, polyethylene, polyvinyl chloride, polyalkene containing a halogen element such as polyalkene halide, and wherein, preferably, the organic small molecular material is selected from the group consisting of C$_4$-C$_{30}$ linear hydrocarbons or aromatic hydrocarbons with a benzene ring structure.

Embodiment 6

The method of embodiment 1, wherein the organic material has a crystallinity of 0-30% or 20-40% or 50-80% or 60%-90%, and a molecular weight of 50-50000, preferably 50-10000.

Embodiment 7

The method of embodiment 1, wherein the weight ratio of the organic material to the reaction medium is 5:1-1:500, preferably 1:3-1:70.

Embodiment 8

A sulfonated graphene, wherein the sulfonated graphene has a sulfonated group and is characterized in that: the sulfonated graphene has a carbon/sulfur ratio of 12:1-1:1, preferably of 10:1-2:1, more preferably of 8:1-3:1, most preferably of 6:1-3:1.

Embodiment 9

The sulfonated graphene of embodiment 8, wherein the sulfonated graphene has a sheet diameter, i.e. a planar diameter of the sulfonated graphene, of larger than 10 micrometers, preferably larger than 50 micrometers, more preferably larger than or equal to 100 micrometers and smaller than 1000 micrometers; and a thickness, i.e. the extent in the normal direction of the plane of the sulfonated graphene, of 0.5-100 nanometers, preferably 1-50 nanometers, preferably 1-10 nanometers; preferably, the sulfonated graphene has a thickness uniformity of more than 90%, and preferably, the sulfonated graphene has a sheet diameter uniformity of more than 90%.

Embodiment 10

Use of the sulfonated graphene of embodiment 8 or 9 in transparent conductive electrode, thermal conductive material, supercapacitor, transistor, fuel cell, integrated circuit, solar cell, biocarrier, complex agent, composite material, chelating agent, waterborne coating, water-based lubricant, mobile device, aerospace material, ink or photosensitive element.

DETAILED DESCRIPTION

Definition

Figure 1:
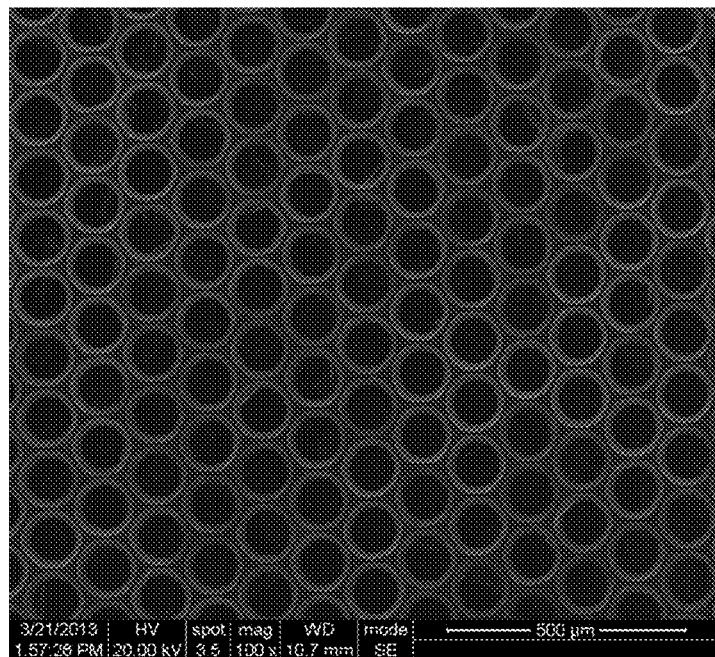
FIGS. 1 and 2 are scanning electron microscope photographs of the sulfonated graphene prepared according to the present invention, respectively, and evidence an advantage of the sulfonated graphene powder prepared by the method of the present invention.

Organic materials: may also be referred to as organic matters and have the general meaning understood by a person skilled in the art. Organic materials have few component elements which mainly are carbon and hydrogen and optionally further comprise other elements such as hydrogen or nitrogen or the like. Organic materials have a relative molecular mass from tens up to millions. Organic materials comprise organic polymer materials and organic small molecular materials. An organic polymer material is a compound formed by repeatedly connecting one or more kinds of organic structural units. Conventional organic materials comprise: polyolefin, such as polyethylene, polypropylene, polyvinyl chloride, polyvinyl dichloride, polybutylene, polyethylene-octylene copolymer, polytetrafluoroethylene; polyyne, such as polyacetylene; polyester, such as polyethylene terephthalate, polybutylene terephthalate; polyether, such as polyphenylene oxide; polyetheretherketone; polyamide, such as Nylon; polyurea; butane; butene; hexane; octane; octane; benzene; etc.

Sulfonated graphene: a two-dimensional material, similar as graphene oxide and graphene, the sulfonated graphene is a carbon material connected with sulfonic acid or sulfonate functional groups through chemical bonds. In the present invention, those terms "sulfonated graphene", "sulfonated carbon material" and "carbon material containing sulfonate functional groups" have similar meanings and can be exchanged with one another. The applicants of the present invention have found that the sulfonated graphene of the present invention still maintains the laminated structure of graphite but is introduced with a plurality of sulfonate functional groups on each layer of graphene single sheet. The introduction of these sulfonate functional groups complicates the simple graphene structure and brings about hydrophilicity such that the sulfonated graphene has improved usability while has excellent properties of graphene in various applications. In the laminated structure of the sulfonated graphene of the present invention, the thickness of the laminated structure may be 1-300 nanometers, preferably 1-200 nanometers, such as 1-100 nanometers, such as 1-50 nanometers, such as 1-40 nanometers, such as 1-30 nanometers, such as 3-20 nanometers, such as 3-15 nanometers, such as 5-10 nanometers.

Oxidative sulfonating agent: a sulfonating agent having oxidizing ability. The oxidizing and sulfonating abilities of the oxidative sulfonating agent may be provided by different matters, respectively. For example, one matter provides the oxidating ability, and one matter provides the sulfonating ability. Typical oxidative sulfonating agent is selected from the group consisting of: compounds having the general formula of $R-SO_3H$, wherein R is selected from F, Cl, and Br, the combination of $H_2SO_4$ and HCl; the combination of $H_2SO_4$ and HF; concentrated sulfuric acid; fuming sulfuric acid; $SO_3$; and combinations thereof.

Reaction medium: in the present application, the reaction medium mainly means the combination of the oxidative sulfonating agent and an optional solvent, wherein the solvent may be an organic solvent such as chloromethane or ethanol; or an inorganic solvent such as hydrogen chloride.

Melting temperature: the melting temperature as described in the present application means the melting point, Tg (glass transition temperature) or melting range in the case that the organic material used in the present application is contacted with the reaction medium as described in the present application. In other words, melting temperature, melting point, Tg (glass transition temperature) or melting range as mentioned in the present application means the lowest temperature or temperature range at which the organic material is in its amorphous state in the case that the organic material is contacted with the reaction medium.

Sheet diameter of sulfonated graphene: means the planar diameter of the sulfonated graphene material.

Thickness of sulfonated graphene: means the extent in the normal direction of the plane of the sulfonated graphene material.

Uniformity: defines the density distribution within the sheet diameter and thickness ranges, therefore there are two uniformity indices, sheet diameter uniformity and thickness uniformity. Obviously, for one product, the sheet diameter uniformity and the thickness uniformity are usually consistent or identical. The calculation method of the uniformity is as follows: dividing the sheet diameter and thickness into ten intervals by size, the extreme value of the distribution is the uniformity. By taking the sheet diameter as an example, if the product prepared is distributed in 1-100 micrometers, each of 10 micrometers is defined as one interval and the extreme value of the distribution is the uniformity. For example, if the sample prepared in 70-80 micrometers accounts for 80% of the density distribution of the product prepared, this batch of product has a diameter of 70-80 micrometers and a uniformity of 80%.

First Aspect

A first aspect of the present invention relates to a method for preparing sulfonated graphene from organic material, the method comprising:

a first contact step: contacting a reaction medium containing an oxidative sulfonating agent with the organic material at a first temperature; and a second contact step: after the first contact step has been finished, increasing the reaction temperature of the whole system to a second temperature to continue to react, thereby obtaining the sulfonated graphene. In a preferable embodiment, the method of the present invention is carried out in the same reaction medium.

In the first contact step of the method of the present invention, the first temperature is preferably higher than the melting point of the organic material. In that case, the organic material is in its amorphous molten state (the organic material is considered to be in amorphous state if it exists in the reaction medium in the form of solution). The organic material in this state is oxidized to carbon material such as a carbon block or an embryonic form of graphene having a certain size, and a small amount of carbon is sulfonated. The carbon material formed in the first step is formed from the organic material in amorphous state, and therefore is very loose in itself. For example, if the carbon material is in the state of carbon block, the material has a fewer graphene layer number.

In the second contact step of the method of the present invention, the second temperature is preferably equal to or higher than the boiling point of the reaction medium. In that case, the carbon material formed in the first step is sulfonated. Because the reaction temperature is relatively higher, the reaction rate is rapid, thus the sulfonation may also be carried out between the sheet layers of the formed carbon material such as graphite or graphene. Thus, the sulfonated graphene product is prepared.

If only one contact step is used, the purpose frequently cannot be achieved and a sulfonated graphene product with a high uniformity cannot be obtained.

The organic material used in the present invention is selected from organic polymer materials and organic small molecular materials, wherein, preferably, the organic polymer material is selected from the group consisting of: polyethylene wax, chlorinated polyethylene, acetylene oligomer, polyacetylene, polyalkyne halides (polyalkynes containing halogen elements), polyethylene, polyvinyl chloride, polyalkene halides (polyalkenes containing halogen elements), and wherein, preferably, the organic small molecular material is selected from the group consisting of $C_4$-$C_{50}$ linear hydrocarbons or aromatic hydrocarbon, such as $C_8$-$C_{30}$ linear hydrocarbons, $C_4$-$C_{50}$ olefins or alkynes, benzene or pyrene or phenanthrene. The molecular weight of the organic polymer material may be 200-50000, such as 500-40000, such as 1000-30000, such as 2000-20000, such as 3000-15000, such as 4000-12000, such as 5000-11000, such as 6000-10000, such as 7000-9000, such as 8000-8500. Polyethylene wax with a molecular weight of 3000-10000 is particularly suitable, because the polyethylene wax has a melting point of 90-110° C.; is particularly suitable for operation; and has a wide raw material source. The organic small molecular material is preferably hydrocarbon compounds, such as olefins or alkynes or aromatic hydrocarbons, preferably $C_4$-$C_{50}$ alkanes, olefins or alkynes, wherein the $C_4$-$C_{50}$ range contains the end points and covers all subranges therein, such as $C_5$-$C_{40}$, $C_6$-$C_{45}$, $C_8$-$C_{30}$, $C_{10}$-$C_{25}$, $C_{12}$-$C_{20}$, or $C_{14}$-$C_{18}$. The molecular weight range of the organic small molecular material may be 50-800, such as 80-700, such as 100-500, such as 150-300, such as 200-250. As defined, the organic small molecular material may still contain atoms other than carbon and hydrogen, such as oxygen, nitrogen, sulfur, etc. However, the small molecular material preferably contains only nitrogen atom as heteroatom, more preferably does not contains any heteroatom.

In an embodiment, the first temperature used in the first contact step is from the melting temperature of the organic material to lower than the boiling point of the reaction medium; and the second temperature is not lower than the boiling point of the reaction medium. The selection of the first temperature is dependent upon the melting temperature of the organic material, the boiling point of the reaction medium, the desired reaction speed and other factors. In a preferred embodiment, the first reaction temperature is between the melting temperature of the organic material and the boiling point of the reaction medium. The first temperature selected in this way enables the organic material to be in an amorphous state such that a loose carbon material can be easily prepared for further sulfonation and delamination in the second contact step; and achieves a suitable reaction speed such that the reaction is not too acute to cause safety issues. Where possible, if a higher reaction speed is desired, a higher reaction temperature is preferably used. Generally, as for organic small molecular materials, a relative low first temperature may be selected, such as less than 100° C., such as less than 90° C., such as less than 80° C., such as less than 70° C., such as less than 60° C., such as less than 50° C., generally less than 40° C. or lower temperature, such as less than 35° C., less than 30° C., less than 20° C., less than 15° C., less than 10° C., less than 5° C., even less than 0° C.

As for organic polymer materials, the melting temperature thereof is generally relative higher, thus a relative higher first temperature may be selected. In an embodiment, the first temperature is 40-140° C., such as 45-130° C., such as 50-125° C., such as 55-120° C., such as 60-115° C., such as 65-110° C., such as 70-105° C., such as 65-100° C., such as 75-95° C., such as 80-90° C.

In an embodiment of the method of the present invention, the second temperature is not lower than the boiling point of the reaction medium. The second temperature is preferably the boiling point of the reaction medium or higher temperature. The second temperature is selected in this way such that a laminated sulfonated graphene sheet with uniform properties is formed in the second contact step. The upper limit of the temperature is not limited, however, the selection thereof should enable the reaction to meet the requirement of safety production. In the reaction medium used in the present invention, the concentration of the oxidative sulfonating agent in the reaction medium is higher than 98%, more preferably higher than or equal to 99%, most preferably 100%, that is, the reaction medium is the oxidative sulfonating agent. In the oxidative sulfonating agent used in the present invention, the boiling point of chlorosulfonic acid is 151° C.; the boiling point of fluorosulfonic acid is 163.5° C.; and the boiling point of sulfuric acid is 338° C. Under the condition of high content of oxidative sulfonating agent, the boiling point of the reaction medium is close to that of the oxidative sulfonating agent. However, the boiling point of the medium may be changed to a certain degree because a solute is dissolved in the reaction medium or a mixed oxidative sulfonating agent is used. In a specific embodiment, the second temperature is 150-220° C., such as 155-215° C., such as 160-210° C., such as 165-205° C., such as 170-200° C., such as 175-195° C., such as 180-190° C.

In an embodiment of the present invention, the boiling point of the reaction medium is preferably higher than the melting temperature of the organic material. In other words, the melting temperature of the organic material is lower than the boiling point of the reaction medium. In a preferred embodiment, the boiling point of the reaction medium is more than 10° C., preferably more than 20° C., preferably more than 30° C., preferably more than 40° C. higher than the melting temperature of the organic material. When the difference between the boiling point of the reaction medium and the melting temperature of the organic material is relative greater, the first contact step and the second contact step can be easily distinguished by the reaction temperatures, thereby facilitating the control of the reactions.

Generally, the method of the present invention is carried out in atmospheric pressure, thus the melting temperature, boiling point, etc. as described in the present invention are values determined in atmospheric pressure, unless expressly stated contrarily. Obviously, it is anticipated in the present invention that the method of the present invention may also be carried out in higher pressure or in vacuum, such as in the pressure of 1 kPa, 5 kPa, 10 kPa, 20 kPa, 50 kPa, etc. When the second contact step is carried out in higher pressure, the second temperature may be suitably increased according to the reaction conditions and requirements. When the second contact step is carried out in vacuum, the second temperature may be suitably decreased according to the reaction conditions and requirements. Similarly, when the first contact step is carried out in non-atmospheric pressure, the first temperature may also be varied according to the circumstances.

In the present invention, the durations of the first contact step and the second contact step are not specifically limited as long as the purpose of the present invention may be achieved. Generally, the duration of the first contact step is 1-40 hours; and the duration of the second contact step is 1-40 hours, wherein the range of 1-40 hours covers all values and subranges between 1 hour to 40 hours, such as 2-35 hours, such as 3-30 hours, such as 4-28 hours, such as 5-25 hours, such as 6-20 hours, such as 7-18 hours, such as 8-16 hours, such as 9-12 hours, such as 10-11 hours, etc.

The organic material used in the present invention may have a certain crystallinity degree under normal temperature and pressure. In a specific embodiment, the crystallinity degree of the organic material is 0-90%, such as 0-30%, such as 20-40%, such as 50-80%, such as 60-90%. In a preferred embodiment, the crystallinity degree of the organic material of the present invention is 0-30%, or 0-15%, or 0-10%, or 0-5%. The present inventor has found that an organic material with a low crystallinity degree is more beneficial for rapidly achieving an amorphous molten state above the melting temperature, thereby facilitating the preparation of a loose carbon material. If a material with a high crystallinity degree has not timely transited into the amorphous molten state, a protective layer would be formed for inner material because of the carbonization of the surface material such that the organic material cannot be fully carbonized in the first contact step.

The sulfonated graphene prepared by the method of the present invention has a thickness of 0.5-300 nanometers, such as 1-200 nanometers, such as 0.5-100 nanometers, preferably 1-50 nanometers, such as 1-20 nanometers, such as 1-10 nanometers. The thickness of the sulfonated graphene prepared can be controlled by adjusting the ratio of the reaction medium or the oxidative sulfonating agent therein, such as chlorosulfonic acid or fluorosulfonic acid, to the organic material. Generally, the weight ratio of the organic material to the reaction medium is 1:1-1:500, preferably 1:2-1:200, such as 1:3-1:100, such as 1:5-1:90, such as 1:10-1:80, such as 1:20-1:70, such as 1:30-1:60, such as 1:40-1:50. Generally, the method of the present invention is carried out with an excess amount of the oxidative sulfonating agent both in the first contact step and in the second contact step. The applicants of the present application has unexpectedly found that the thickness of the sulfonated graphene obtained is lower when the proportion of the reaction medium or the oxidative sulfonating agent in the raw material is higher, that is, when the amount of the reaction medium or the oxidative sulfonating agent is higher. In a preferred embodiment, when the amount of the reaction medium or the oxidative sulfonating agent is more than 60 times of that of the organic material, a sulfonated graphene may be obtained with a thickness of 1-2 nm which corresponds to the thickness of 1-2 sulfonated graphene layers. By taking the cost into account, the amount of the reaction medium or the oxidative sulfonating agent used is generally no higher than 100 times of that of the organic material. In a preferred embodiment, when the amount of the reaction medium or the oxidative sulfonating agent is from 30 times to lower than 60 times of that of the organic material, a sulfonated graphene may be obtained with a thickness of 3-5 nm. In a preferred embodiment, when the amount of the reaction medium or the oxidative sulfonating agent is from 20 times to lower than 30 times of that of the organic material, a sulfonated graphene may be obtained with a thickness of 5-10 nm. In a preferred embodiment, when the amount of the reaction medium or the oxidative sulfonating agent is from 10 times to lower than 20 times of that of the organic material, a sulfonated graphene may be obtained with a thickness of 10-20 nm.

The method of the present invention is carried out in solution or in a uniform molten state, and the whole reaction process is uniform under the help of the reaction medium, thus the sulfonated graphene product obtained has a very high uniformity. Generally, the uniformity of the sulfonated graphene of the present invention is higher than 50%, preferably higher than 60%, even higher than 70%, even higher than 80%, even higher than 90%, even higher than 91%. In the present application, under the circumstance of no specific indication, the uniformity described means both the thickness uniformity and the sheet diameter uniformity.

When the crystallinity degree of the organic material is lower; when the ratio of the reaction medium to the organic material is higher; and when the reaction process is controlled more finely, the uniformity of the final product is higher.

A sulfonated graphene with a high uniformity especially exhibits great practicability in applications. For example, when the sulfonated graphene of the present invention is applied to strengthen polymer materials such as epoxy resin, the flexural strength and the impact strength thereof can be significantly improved without substantially reducing the tensile strength of the polymer materials.

The sulfonated graphene prepared by the method of the present invention has generally a sheet diameter of from larger than or equal to 10 micrometers to less than or equal to 1000 micrometers, such as larger than or equal to 50 micrometers, larger than or equal to 100 micrometers, or larger than or equal to 300 micrometers. The applicants have unexpectedly found that the sheet diameter of the sulfonated graphene can be controlled by selecting the molecular weight of the organic material. Specifically, the higher the molecular weight of the organic material is, the larger the sheet diameter of the sulfonated graphene obtained is, vice versa. More specifically, when the molecular weight of the organic material is no less than 8000, the sheet diameter of the sulfonated graphene obtained is 90-120 μm; when the molecular weight of the organic material is from 5000 to less than 8000, the sheet diameter of the sulfonated graphene obtained is 80-100 μm; when the molecular weight of the organic material is from 3000 to less than 5000, the sheet diameter of the sulfonated graphene obtained is 60-90 μm; when the molecular weight of the organic material is from 2000 to less than 3000, the sheet diameter of the sulfonated graphene obtained is 50-80 μm; and when the organic material used has a lower molecular weight, even when an organic small molecular material is used, the sheet diameter of the sulfonated graphene obtained is 20-50 μm.

The sulfonated graphene obtained by the method of the present invention has a C/S ratio (carbon/sulfur ratio) of 12:1-1:1, preferably 10:1-2:1, more preferably 8:1-3:1, most preferably 6:1-3:1. The terms "C/S ratio (carbon/sulfur ratio)" used in the present invention means the ratio of the number of carbon atoms to the number of sulfur atoms, that is, the molar ratio thereof, in the sulfonated graphene. Generally, the C/S ratio of the sulfonated graphene may be controlled by controlling the temperatures and duration of the first and second contact steps. Specifically, the longer the time of the contact steps is, the higher the sulfur content of the sulfonated graphene is, vice versa. Further specifically, the higher the reaction temperature is, the lower the C/S ratio of the sulfonated graphene obtained is, that is, the higher the sulfur content is, vice versa. However, the preferred C/S ratio of the sulfonated graphene of the present invention is higher than 3:1 and lower than 120:1, that is, the number of the sulfur atoms is less than or equal to 1/3 but greater than or equal to 1/120 of the number of the carbon atoms. C/S ratio reflects the amount of sulfonic acid groups connected in the sulfonated graphene. When the content of sulfur atoms is higher, the graphene has higher water solubility and higher complexing efficiency of copper ions, vice versa. The sulfonated graphene obtained by the method of the present invention has water solubility of about 2.0 wt % to about 30 wt %, and the complexing amount of copper ions may be about 0.30 to 5 g/g. For example, when the C/S ratio is 6/1, the sulfonated graphene obtained has water solubility of up to about 27 wt %, and the complexing amount of copper ions may be up to about 4.85 g/g; when the C/S ratio is 12/1, the sulfonated graphene obtained has water solubility of up to about 15 wt %, and the complexing amount of copper ions may be up to about 2.15 g/g; when the C/S ratio is 30/1, the sulfonated graphene obtained has water solubility of about 8 wt %, and the complexing amount of copper ions may be about 1.02 g/g; when the C/S ratio is 60/1, the sulfonated graphene obtained has water solubility of about 3.2 wt %, and the complexing amount of copper ions may be up to about 0.60 g/g; and when the C/S ratio is 120/1, the sulfonated graphene obtained has water solubility of about 2.0 wt %, and the complexing amount of copper ions is about 0.35 g/g. However, when the sulfur content is too high such that the number of sulfur atoms is greater than 1/3 of the number of carbon atoms, in the sulfonated graphene product obtained, the structure of the graphene is destroyed seriously, which may result in the degradation of the efficiency of the sulfonated graphene in applications. When the sulfur content is too lower such that the water solubility of the graphene is decreased, the amount of the graphene used in applications may be decreased, which may result in unsatisfactory application performances as well. Furthermore, the C/S ratio of the sulfonated graphene may be adjusted by performing a high temperature treatment to the sulfonated graphene obtained, such as treating for a while, such as for 15 minutes to 8 hours, such as for 30 minutes, 1 hour, 4.5 hours, 8 hours, etc., in a nitrogen atmosphere protected furnace at 300° C. or 350° C. Generally, during the treatment, the higher the water temperature is and the longer the treatment time is, the greater the proportion of sulfur atoms is decreased, vice versa.

Second Aspect

A second aspect of the present invention relates to a sulfonated graphene product, wherein the sulfonated graphene is provided with sulfonic acid groups and is characterized in that: the C/S ratio of the sulfonated graphene is 12:1-1:1, preferably 10:1-2:1, more preferably 8:1-3:1, most preferably 6:1-3:1. The terms "C/S ratio" used in the present invention means the ratio of the number of carbon atoms to the number of sulfur atoms, that is, the molar ratio thereof, in the sulfonated graphene obtained.

C/S ratio reflects the amount of sulfonic acid groups connected in the sulfonated graphene. When the content of sulfur atoms is higher, the graphene has higher water solubility and higher complexing efficiency of copper ions, vice versa. The sulfonated graphene obtained by the method of the present invention has water solubility of about 2.0 wt % to about 25 wt %, and the complexing amount of copper ions may be about 0.30 to 5 g/g. For example, when the ratio of sulfur atoms to carbon atoms is 1/6, the graphene obtained has water solubility of up to about 21 wt %, and the complexing amount of copper ions may be up to about 4.85 g/g; when the ratio of sulfur atoms to carbon atoms is 1/12, the graphene obtained has water solubility of up to about 15 wt %, and the complexing amount of copper ions may be up to about 2.15 g/g; when the ratio of sulfur atoms to carbon atoms is 1/30, the graphene obtained has water solubility of about 8 wt %, and the complexing amount of copper ions is about 1.02 g/g; when the ratio of sulfur atoms to carbon atoms is 1/60, the graphene obtained has water solubility of about 3.2 wt %, and the complexing amount of copper ions may be up to about 0.60 g/g; and when the ratio of sulfur atoms to carbon atoms is 1/120, the graphene obtained has water solubility of about 2.0 wt %, and the complexing amount of copper ions is about 0.35 g/g. However, when the sulfur content is too high such that the number of sulfur atoms is greater than 1/3 of the number of carbon atoms, in the sulfonated graphene product obtained, the structure of the graphene is destroyed seriously, which may result in the degradation of the performance of the sulfonated graphene in applications. When the sulfur content is too lower such that the water solubility of the graphene is decreased, the amount of the graphene used in applications may be decreased, which may result in unsatisfactory application performances as well.

In a specific embodiment, the sulfonated graphene of the present invention has a sheet diameter, i.e. a planar diameter of the material, of larger than 10 micrometers, preferably larger than 50 micrometers, more preferably larger than or equal to 100 micrometers and smaller than 1000 micrometers. In a specific embodiment, the sulfonated graphene of the present invention has a thickness, i.e. the distance in the normal direction of the plane of the material, of 0.5-100 nanometers, preferably 1-50 nanometers, preferably 1-10 nanometers. In a preferred embodiment, the sulfonated graphene has a thickness uniformity of more than 90%. In a more preferred embodiment, the sulfonated graphene has a sheet diameter uniformity of more than 90%.

Figure 2:
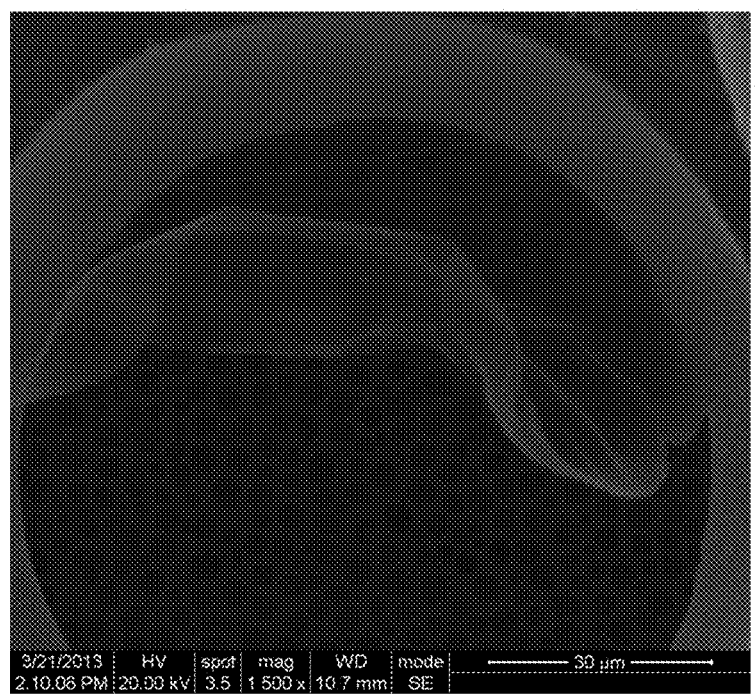

FIGS. 1 and 2 are scanning electron microscope photographs of the sulfonated graphene prepared in Example 2 of the present invention, respectively, and evidence the above-mentioned advantages of the sulfonated graphene powders prepared by the method of the present invention. Specifically, from these figures, the sulfonated graphene has a sheet diameter of 50-100 micrometers, a thickness of 1-2 nanometers, a thickness uniformity of 95%, a sheet diameter of 80-90 micrometers, and a sheet diameter uniformity of 92%.

Third Aspect

An third aspect of the present invention relates to use of the sulfonated graphene product of the present invention or the sulfonated graphene obtained by the method of the present invention. The sulfonated graphene product prepared by the present invention may be used in various known graphene applications and not limited thereto. Sulfonated graphene has a very wide material application range. The sulfonated graphene is a new type of carbon material with excellent performances, and has a relative high specific surface area and abundant sulfonic acid functional groups. The sulfonated graphene may be used to prepare composite materials including polymer composite materials and inorganic composite materials. Currently, the sulfonated graphene of the present invention may be applied in transparent conductive electrodes, thermal conductive materials, supercapacitors, transistors, fuel cells, integrated circuits, solar cells, biocarrier, complex agents, composite materials, chelating agents, waterborne coatings, water-based lubricants, mobile devices, aerospace materials, inks or photosensitive elements.

Example 14 of the present invention illustrates use of the sulfonated graphene of the present invention for forming a polymer composite material, wherein the sulfonated graphene of the present invention is mixed with epoxy resin, thereby obtaining a toughened epoxy resin. The flexural strength and impact strength of the toughened resin is significantly improved without substantially remaining the tensile strength. This effect is obviously superior to that of those graphenes or modified graphenes in prior art.

EXAMPLES

In the examples in the present application, the following raw materials are used; other raw materials are conventional or commercially available.

TABLE 1

| Raw material | Source | Property remarks |
| --- | --- | --- |
| Hexadecane | Aladdin Reagent (Shanghai) Co. Ltd., n-hexadecane | Colorless liquid, melting point of 18° C., boiling point of 287° C. |
| Polyethylene wax with a molecular weight of 2000 | Ningbo Fumei Chemical Co. Ltd., PEW-5 | Molecular weight of 2000, waxy solid, melting point of 96-99° C. |
| Polyethylene wax with a molecular weight of 3000 | Ningbo Fumei Chemical Co. Ltd., PEW-7 | Molecular weight of 3000, waxy solid, melting point of 98-102° C. |
| Polyethylene wax with a molecular weight of 5000 | Ningbo Fumei Chemical Co. Ltd., PEW-8 | Molecular weight of 5000, waxy solid, melting point of 102-106° C. |
| Polyethylene wax with a molecular weight of 8000 | Ningbo Fumei Chemical Co. Ltd., PEW-9 | Molecular weight of 8000, waxy solid, melting point of 106-110° C. |
| Low density polyethylene with a molecular weight of 30000 | Qilu Petrochemical Company, SINOPEC, LLPE | Low density polyethylene, molecular weight of 30000, character of white particles, melting point of 127-129° C. |
| Polyvinyl chloride with a molecular weight of 30000 | Qilu Petrochemical Company, SINOPEC, PVC | Molecular weight of 30000, white powders, melting point of 163-167° C. |
| Fuming sulfuric acid | Tianjin Bohai Chemical Industry Group, fuming sulfuric acid | Light brown viscous fuming liquid |
| Chlorosulfonic acid | Tianjin Bohai Chemical Industry Group, chlorosulfonic acid | Light yellow liquid |

Test Methods

Graphene (the characterization thereof): generally, graphene may be characterized by X ray diffraction, infrared spectrum, Raman spectrum, transmission electron microscope (TEM), scanning electron microscope (SEM), atomic force microscope (ATM) and other methods. In the present application, the sulfonated graphene is characterized mainly by infrared spectrum, X ray diffraction, Raman spectrum and atomic force microscope, wherein there are absorption peaks at 1130 cm$^{-1}$ and 1400 cm$^{-1}$ in infrared spectrum; there is an amorphous envelope peak at 2θ=26° in X ray diffraction spectrum; there are D peak and G peak at 1360 cm$^{-1}$ and 1580 cm$^{-1}$ in Raman spectrum; the product presents two-dimensional morphology by characterizing by atomic force microscope; and when the thickness is 1-20 nanometers, the product is represented as sulfonated graphene.

C/S ratio (carbon/sulfur ratio): the C/S ratio of the sulfonated graphene may be measured by elemental analysis, XPS, spherical aberration corrected electron microscope surface scanning and other methods. The results measured by these methods are similar. In the present invention, C/S ratio is measured by elemental analysis.

Sheet diameter: the sheet diameter of the sulfonated graphene may be measured by transmission electron microscope, SEM, AFM and other methods. The results measured by these methods are similar. In the present invention, the sheet diameter is measured mainly by scanning electron microscope and atomic force microscope methods.

Thickness: the thickness of the sulfonated graphene may be measured by AFM, optical microscope, transmission electron microscope and other methods. The results measured by these methods are similar. In the present invention, the thickness is measured mainly by atomic force microscope method.

Melting temperature (melting point, Tg, melting range): in the present invention, the melting points (melting temperature), Tg or melting ranges of the materials are measured by melting point meter, DSC and other methods or by using thermometers. These measuring methods are well known by a person skilled in the art.

Boiling point: in the present invention, the boiling points of the materials may be measured by using thermometers by those methods commonly used by a person skilled in the art.

Uniformity: the uniformities in terms of thickness and sheet diameter of the sulfonated graphene may be determined based on the thickness and sheet diameter as measured above by the following steps: dividing the sheet diameter and thickness by size. By taking the sheet diameter as an example, if the product prepared is distributed in 1-100 micrometers, each of 10 micrometers is defined as one interval and the sheet diameter is divided into ten intervals. The extreme value of the distribution is the uniformity. For example, if the sample prepared in 70-80 micrometers accounts for 80% of the product prepared, this batch of product has a diameter of 70-80 micrometers and a uniformity of 80%. Further by taking the thickness as another example, if the product prepared is distributed in 0-10 nanometers, each of 1 nanometer is defined as one interval and the thickness is divided into ten intervals. The extreme value of the distribution is the uniformity. For example, if the sample prepared in thickness of 1-2 nanometers accounts for 80% of the product prepared, this batch of product has a thickness of 1-2 nanometers and a uniformity of 80%.

Example 1

(Hexadecane, Colorless Liquid, Melting Point of 18° C., Boiling Point of 287° C.)

In a fuming hood, 600 g of chlorosulfonic acid with a purity of 99% is added as reaction medium into a 2 L open three-necked glass reactor. The reactor is heated to 50° C. by using an oil bath, and maintains this temperature. 10 g of hexadecane is added and the reaction is carried out for 3 hours. After that, the temperature is slowly increased to 160° C. and the reaction is carried out at this temperature for 12 hours. The reactor content is cooled, filtered and washed with deionized water to obtain 9 g of sulfonated graphene product which is yellowish-brown powders. The characterization of the sulfonated graphene: by characterizing by XRD and infrared spectrum, it is found that the product is a carbon material containing sulfonic acid groups and there are an envelope peak at $2\theta=26°$ in XRD and obvious G and D peaks characteristic of carbon material in Raman spectrum; and it is found by measurements that the sulfonated graphene has a sheet diameter of 10-20 μm and a sheet diameter uniformity of 95% in this range; a thickness of 1-2 nm and a thickness uniformity of 95% in this range; and a C/S ratio of 3:1.

Example 2

(Polyethylene Wax with a Molecular Weight of 3000, Waxy Solid, Melting Point of 98-102° C.)

In a fuming hood, 600 g of chlorosulfonic acid with a purity of 99% is added as reaction medium into a 2 L open three-necked glass reactor. The reactor is heated to 110° C. by using an oil bath, and maintains this temperature. 10 g of polyethylene wax with a molecular weight of 3000 is added and the reaction is carried out for 4 hours. After that, the temperature is slowly increased to 180° C. and the reaction is carried out at this temperature for 10 hours. The reactor content is cooled, filtered and washed with deionized water to obtain 15 g of sulfonated graphene product which is yellowish-brown powders. The characterization of the sulfonated graphene: by characterizing by XRD and infrared spectrum, it is found that the product is a carbon material containing sulfonic acid groups and there are an envelope peak at $2\theta=26°$ in XRD and obvious D and G peaks characteristic of carbon material at 1360 cm$^{-1}$ and 1580 cm$^{-1}$ in Raman spectrum; it is found by measurements that the sulfonated graphene has a sheet diameter of 80-90 micrometers and a sheet diameter uniformity of 92% in this range; a thickness of 1-2 nm and a thickness uniformity of 95% in range; and a C/S ratio of 6:1.

Example 3

(Low Density Polyethylene with a Molecular Weight of 30000, White Particles, Melting Point of 127-129° C.)

In a fuming hood, 600 g of chlorosulfonic acid with a purity of 99% is added as reaction medium into a 2 L open three-necked glass reactor. The reactor is heated to 130° C. by using an oil bath, and maintains this temperature. 20 g of low density polyethylene with a molecular weight of 30000 is added and the reaction is carried out for 4 hours. After that, the temperature is slowly increased to 180° C. and the reaction is carried out at this temperature for 12 hours. The reactor content is cooled, filtered and washed with deionized water to obtain 15 g of sulfonated graphene product which is yellowish-brown powders. The characterization of the sulfonated graphene: by characterizing by XRD and infrared spectrum, it is found that the product is a carbon material containing sulfonic acid groups and there are an envelope peak at $2\theta=26°$ in XRD and obvious D and G peaks characteristic of carbon material at 1380 cm$^{-1}$ and 1530 cm$^{-1}$ in Raman spectrum; it is found by measurements that the sulfonated graphene has a sheet diameter of 90-100 micrometers and a sheet diameter uniformity of 70% in this range; a thickness of 3-5 nm and a thickness uniformity of 83% in this range; and a C/S ratio of 12:1.

Example 4

(Polyethylene Wax with a Molecular Weight of 2000, Waxy Solid, Melting Point of 96-99° C.)

In a fuming hood, 600 g of chlorosulfonic acid with a purity of 99% is added as reaction medium into a 2 L open three-necked glass reactor. The reactor is heated to 100° C. by using an oil bath, and maintains this temperature. 20 g of polyethylene wax with a molecular weight of 2000 is added and the reaction is carried out for 6 hours. After that, the temperature is slowly increased to 180° C. and the reaction is carried out at this temperature for 12 hours. The reactor content is cooled, filtered and washed with deionized water to obtain 32 g of sulfonated graphene product which is yellowish-brown powders. The characterization of the sulfonated graphene: by characterizing by XRD and infrared spectrum, it is found that the product is a carbon material containing sulfonic acid groups and there are an envelope peak at $2\theta=26°$ in XRD and obvious D and G peaks characteristic of carbon material at 1380 cm$^{-1}$ and 1560 cm$^{-1}$ in Raman spectrum; it is found by measurements that the sulfonated graphene has a sheet diameter of 50-60 micrometers and a sheet diameter uniformity of 90% in this range; a thickness of 3-5 nm and a thickness uniformity of 90% in this range; and a C/S ratio of 6:1.

Example 5

(Polyvinyl Chloride with a Molecular Weight of 30000, White Powders, Melting Point of 163-167° C.)

In a fuming hood, 600 g of chlorosulfonic acid with a purity of 99% is added as reaction medium into a 2 L open three-necked glass reactor. The reactor is heated to 120° C. by using an oil bath, and maintains this temperature. 15 g of polyvinyl chloride with a molecular weight of 50000 is added and the reaction is carried out for 6 hours. After that, the temperature is slowly increased to 180° C. and the reaction is carried out at this temperature for 12 hours. The reactor content is cooled, filtered and washed with deionized water to obtain 12 g of sulfonated graphene product which is brown powders. The characterization of the sulfonated graphene: by characterizing by XRD and infrared spectrum, it is found that the product is a carbon material containing sulfonic acid groups and there are an envelope peak at $2\theta=26°$ in XRD and obvious D and G peaks characteristic of carbon material at 1350 cm$^{-1}$ and 1570 cm$^{-1}$ in Raman spectrum; it is found by measurements that the sulfonated graphene has a sheet diameter of 100-110 μm and a sheet diameter uniformity of 65% in this range; a thickness of 3-5 nm and a thickness uniformity of 75% in this range; and a C/S ratio of 12:1.

Example 6

(Polyvinyl Chloride with a Molecular Weight of 30000, Character of White Powders, Melting Point of 163-167° C.)

In a fuming hood, 600 g of chlorosulfonic acid and fuming sulfuric acid (the volume ratio of chlorosulfonic acid and fuming sulfuric acid being 2:1) are added as reaction medium into a 2 L open three-necked glass reactor. The reactor is heated to 120° C. by using an oil bath, and maintains this temperature. 15 g of polyvinyl chloride with a molecular weight of 30000 is added and the reaction is carried out for 6 hours. After that, the temperature is slowly increased to 180° C. and the reaction is carried out at this temperature for 12 hours. The reactor content is cooled, filtered and washed with deionized water to obtain 11 g of sulfonated graphene product which is brown powders. The characterization of the sulfonated graphene: by characterizing by XRD and infrared spectrum, it is found that the product is a carbon material containing sulfonic acid groups and there are an envelope peak at 2θ=26° in XRD and obvious D and G peaks characteristic of carbon material at 1360 cm$^{-1}$ and 1580 cm$^{-1}$ in Raman spectrum; it is found by measurements that the sulfonated graphene has a sheet diameter of 100-110 μm and a sheet diameter uniformity of 52% in this range; a thickness of 3-6 nm and a thickness uniformity of 60% in this range; and a C/S ratio of 18:1.

Example 7

(Polyethylene Wax with a Molecular Weight of 3000, Waxy Solid, Melting Point of 98-102° C.)

In a fuming hood, 600 g of fluorosulfonic acid with a purity of 99% is added as reaction medium into a 2 L open three-necked glass reactor. The reactor is heated to 110° C. by using an oil bath, and maintains this temperature. 10 g of polyethylene wax with a molecular weight of 3000 is added and the reaction is carried out for 4 hours. After that, the temperature is slowly increased to 180° C. and the reaction is carried out at this temperature for 10 hours. The reactor content is cooled, filtered and washed with deionized water to obtain 15 g of sulfonated graphene product which is yellowish-brown powders. The characterization of the sulfonated graphene: by characterizing by XRD and infrared spectrum, it is found that the product is a carbon material containing sulfonic acid groups and there are an envelope peak at 2θ=26° in XRD and obvious D and G peaks characteristic of carbon material at 1360 cm$^{-1}$ and 1580 cm$^{-1}$ in Raman spectrum; it is found by measurements that the sulfonated graphene has a sheet diameter of 80-90 micrometers and a sheet diameter uniformity of 90% in this range; a thickness of 1-2 nm and a thickness uniformity of 94% in this range; and a C/S ratio of 6:1.

Comparative Example 8

In a fuming hood, 600 g of chlorosulfonic acid with a purity of 99% is added as reaction medium into a 2 L open three-necked glass reactor. The reactor is heated to 100° C. by using an oil bath, and maintains this temperature. 20 g of polyethylene wax with a molecular weight of 5000 is added and the reaction is carried out for 6 hours. The reactor content is cooled, filtered and washed with deionized water to obtain 25 g black powders. By characterizing by XRD and infrared spectrum, it is found that the product is a mixture of a carbon material containing sulfonic acid groups and polyethylene wax.

In a fuming hood, 600 g of concentrated sulfuric acid with a purity of 96% is added as reaction medium into a 2 L open three-necked glass reactor. The reactor is heated to 130° C. by using an oil bath, and maintains this temperature. 20 g of the black powders as obtained above are added and the reaction is carried out for 12 hours. The reactor content is cooled, filtered and washed with deionized water to obtain black powders. The black powders have an envelope peak of carbon material at 2θ=26° and crystallization peaks of polyethylene at 2θ=21° and 2θ=24° in XRD.

Comparative Example 9 (A Case Wherein the First Reaction Temperature is not High Enough)

(Polyethylene Wax with a Molecular Weight of 3000, Waxy Solid, Melting Point of 98-102° C.)

In a fuming hood, 600 g of chlorosulfonic acid with a purity of 99% is added as reaction medium into a 2 L open three-necked glass reactor. The reactor is heated to 70° C. by using an oil bath, and maintains this temperature. 10 g of polyethylene wax with a molecular weight of 3000 is added and the reaction is carried out for 4 hours. After that, the temperature is slowly increased to 180° C. and the reaction is carried out at this temperature for 10 hours. The reactor content is cooled, filtered and washed with deionized water to obtain 12 g of black block matter. The black block matter has an envelope peak of carbon material at 2θ=26° and crystallization peaks of polyethylene at 2θ=21° and 2θ=24° in XRD.

Comparative Example 10 (A Case Wherein the Second Reaction Temperature is not High Enough)

(Polyethylene Wax with a Molecular Weight of 3000, Waxy Solid, Melting Point of 98-102° C.)

In a fuming hood, 600 g of chlorosulfonic acid with a purity of 99% is added as reaction medium into a 2 L open three-necked glass reactor. The reactor is heated to 110° C. by using an oil bath, and maintains this temperature. 10 g of polyethylene wax with a molecular weight of 3000 is added and the reaction is carried out for 4 hours. After that, the temperature is slowly increased to 140° C. and the reaction is carried out at this temperature for 10 hours. The reactor content is cooled, filtered and washed with deionized water to obtain 13 g of sulfonated graphene product which is brown powders. By characterizing by XRD and infrared spectrum, it is found that the product is a carbon material containing sulfonic acid groups and there are an envelope peak at 2θ=26° in XRD and obvious D and G peaks characteristic of carbon material at 1360 cm$^{-1}$ and 1580 cm$^{-1}$ in Raman spectrum; it is found by measurements that the sulfonated graphene has a sheet diameter of 80-90 micrometers and a sheet diameter uniformity of 75% in this range; a thickness of 1-15 nm and a thickness uniformity of 85% in this range; and a C/S ratio of 8.3:1.

Comparative Example 11 (A Case Wherein the First Contact Step is Only Used)

(Polyethylene wax with a molecular weight of 3000, waxy solid, melting point of 98-102° C.)

In a fuming hood, 600 g of chlorosulfonic acid with a purity of 99% is added as reaction medium into a 2 L open three-necked glass reactor. The reactor is heated to 110° C. by using an oil bath, and maintains this temperature. 10 g of polyethylene wax with a molecular weight of 3000 is added and the reaction is carried out for 14 hours. The reactor content is cooled, filtered and washed with deionized water (100 ml*3) to obtain 12 g black powders. By characterizing by XRD and infrared spectrum, it is found that the product is a carbon material containing sulfonic acid groups and there are an envelope peak at 2θ=26° in XRD and obvious D and G peaks characteristic of carbon material at 1360 $cm^{-1}$ and 1580 $cm^{-1}$ in Raman spectrum; it is found by measurements that the sulfonated graphene has a sheet diameter of 80-90 micrometers and a sheet diameter uniformity of 60% in this range; a thickness of 1-20 nm and a thickness uniformity of 70% in this range; and a C/S ratio of 9.8:1.

Comparative Example 12 (A Case Wherein the Second Contact Step is Only Used)

The applicants also use polyethylene wax with a molecular weight of 3000 which is directly added into chlorosulfonic acid which has been heated to 160° C. for reaction. However, the reaction is so rapid that explosion may be happened. Therefore it is not suggested that an organic matter is directly placed into a strong acid reaction medium at a temperature higher than the boiling point thereof for reaction.

Example 13

The experiment of Example 4 is repeated except that the proportion of chlorosulfonic acid to organic material is adjusted to look for the relationship between the proportion of raw materials and the thickness of sulfonated graphene. The test results obtained is shown in the following table.

TABLE 2

|  | Proportion | | | |
| --- | --- | --- | --- | --- |
|  | 60:1 | 30:1 | 20:1 | 10:1 |
| Thickness | 1-2 nm | 3-5 nm | 5-10 nm | 10-20 nm |

As seen from the above results, the higher the ratio of chlorosulfonic acid to organic material is, the thinner the sulfonated graphene obtained is. On the contrary, the lower the ratio of chlorosulfonic acid to organic material is, the thicker the sulfonated graphene obtained is.

Example 14

The experiment of Example 4 is repeated except that polyethylene waxes with different molecular weights are used to look for the relationship between the molecular weight of the organic material and the sheet diameter of sulfonated graphene. The test results obtained is shown in the following table.

TABLE 3

|  | Molecular weight of organic material | | | |
| --- | --- | --- | --- | --- |
|  | 2000 | 3000 | 5000 | 8000 |
| Sheet diameter | 50-80 μm | 60-90 μm | 80-100 μm | 90-120 μm |

As seen from the above results, the higher the molecular weight of the organic material is, the larger the sheet diameter of the sulfonated graphene obtained is. On the contrary, the lower the molecular weight of the organic material is, the smaller the sheet diameter of the sulfonated graphene obtained is.

Example 15 (Application Performance Example in Terms of C/S Ratio)

The product of Example 2 is treated for 0.5 h at high temperatures of 300° C. and 350° C. under the protection of purging nitrogen gas, to obtain C/S ratios of 12:1 and 60:1. The product is treated for 2 hours at high temperature of 300° C. under the protection of purging nitrogen gas, to obtain a product having a C/S ratio of 30:1. The product is treated for 6 hours at high temperature of 350° C. under the protection of purging nitrogen gas, to obtain a product having a C/S ratio of 120:1. Then water solubility and copper ion complexing efficiency test is carried out.

TABLE 4

Water solubility of copper ion complexing efficiency of sulfonated graphene with different CS ratio

|  | ratio | | | | |
| --- | --- | --- | --- | --- | --- |
| Performance | 120/1 | 60/1 | 30/1 | 12/1 | 6/1 |
| Water solubility (wt %) | 2.0 | 3.2 | 8 | 15 | 21 |
| Copper ion complexing amount (g/g) | 0.35 | 0.60 | 1.02 | 2.15 | 4.85 |

The copper ion complexing capability of EDTA, a commercially available complexing agent commonly used in the art, is 0.1-0.15 g/g. As seen from the above data, the sulfonated graphene obtained by the method of the present invention has high water solubility and very high copper ion complexing capability. In terms of the sulfonate content, the higher the ratio of the sulfur content in the sulfonate groups to carbon content is, the better the water solubility of the product is achieved. Meanwhile, in terms of metal ion complexing, the higher the sulfonate content is, the better the complexing capability is.

Example 16 (Application Performance Example in Terms of Uniformity)

3.75 g of sample of Example 2 with a uniformity of 92% is taken and casted along with 500 g of epoxy resin (commercially available from Baling Petrochemical) homogeneously in a stainless steel mould, to obtain a toughened epoxy resin.

According to National Standard GB/T1447-2005 and GB1449-2005, each sample is cutted and milled to specified shape and size, and then tested on Instron3369 universal testing machine to determine tensile strength, flexural strength and impact strength of the blank epoxy resin and the toughened epoxy resin. The obtained performance data are compared below as shown in FIG. 5. All data are average values of five sets of test data.

TABLE 5

Mechanical properties of different samples

| Type of resin | tensile strength (Mpa) | flexural strength (Mpa) | impact strength (KJ/m$^2$) |
|---|---|---|---|
| Blank epoxy resin | 45.9 ± 5.0 | 140 ± 10 | 16.36 ± 0.50 |
| toughened epoxy resin | 44.3 ± 2.5 | 220 ± 6 | 34.67 ± 0.63 |

As seen from the compared performances in Table 5, because the sulfonated graphene obtained by the method of the present invention has higher uniformity, the flexural strength and impact strength is significantly improved without substantially changing the tensile strength.

What is claimed is:

1. A method for producing sulfonated graphene from an organic material, the method comprising:
    a first contact step: contacting a reaction medium containing an oxidative sulfonating agent with the organic material at a first temperature to start a sulfonation reaction; and
    a second contact step: after the first contact step has been finished, increasing the first temperature to a second temperature to continue to react, thereby obtaining the sulfonated graphene,
    wherein the first temperature is within a range of 40-130° C., and the second temperature is within a range of 150-220° C.,
    wherein the organic material is selected from the group consisting of organic polymer materials and organic small molecular materials, the organic polymer material being selected from the group consisting of polyethylene wax, chlorinated polyethylene, acetylene oligomer, polyacetylene, polyalkyne containing a halogen element, polyethylene, polyvinyl chloride, and polyalkenes containing a halogen element; and the organic small molecular material being selected from the group consisting of $C_4$-$C_{30}$ linear hydrocarbons and aromatic hydrocarbons with a benzene ring structure, and
    wherein the weight ratio of the organic material to the reaction medium is 5:1-1:500.

2. The method of claim 1, wherein the oxidative sulfonating agent comprises at least one selected from the group consisting of: a compound having a general formula R—$SO_3H$, wherein R is selected from the group consisting of F, Cl, and Br; a combination of $H_2SO_4$ and HCl; a combination of $H_2SO_4$ and HF; concentrated sulfuric acid; fuming sulfuric acid; and a combination thereof.

3. The method of claim 2, wherein a concentration of the oxidative sulfonating agent in the reaction medium is higher than 98 wt %.

4. The method of claim 1, wherein the first contact step is carried out for a duration within a range of from 1 hour to 40 hours, and the second contact step is carried out for a duration within a range of from 1 hour to 40 hours.

5. The method of claim 1, wherein the organic material has a crystallinity of 0-30%, and a molecular weight of 50-50000.

6. The method of claim 1, wherein the second contact step is carried out in the reaction medium containing the oxidative sulfonating agent.

7. A sulfonated graphene, wherein the sulfonated graphene has a sulfonated groups and the sulfonated graphene has a carbon/sulfur ratio of 12:1-1:1; wherein the sulfonated graphene has a sheet diameter, which is a planar diameter of the sulfonated graphene, of larger than 10 micrometers, and a thickness, which is an extent in the normal direction of the plane of the sulfonated graphene, of 0.5-100 nanometers; the sulfonated graphene has a thickness uniformity of more than 80%, and the sulfonated graphene has a sheet diameter uniformity of more than 80%.

8. The sulfonated graphene of claim 7, wherein the sulfonated graphene has a sheet diameter of larger than 50 micrometers; and a thickness of 1-50 nanometers; the sulfonated graphene has a thickness uniformity of more than 90%, and the sulfonated graphene has a sheet diameter uniformity of more than 90%.

9. A material comprising the sulfonated graphene of claim 7, wherein the material is transparent conductive electrode, thermal conductive material, supercapacitor, transistor, fuel cell, integrated circuit, solar cell, biocarrier, complex agent, composite material, chelating agent, waterborne coating, water-based lubricant, mobile device, aerospace material, ink or photosensitive element.

10. The sulfonated graphene of claim 7, wherein the sulfonated graphene has a carbon/sulfur ratio of 10:1-2:1.

11. The sulfonated graphene of claim 7, wherein the sulfonated graphene has a carbon/sulfur ratio of 8:1-3:1.

12. The sulfonated graphene of claim 7, wherein the sulfonated graphene has a carbon/sulfur ratio of 6:1-3:1.

13. The sulfonated graphene of claim 7, wherein the sulfonated graphene has a thickness of 1-10 nanometers.

14. The sulfonated graphene of claim 7, wherein the sulfonated graphene has a thickness of 1-5 nanometers.

15. The sulfonated graphene of claim 7, wherein the sulfonated graphene has a sheet diameter of larger than or equal to 100 micrometers and smaller than 1000 micrometers.

* * * * *